Dec. 15, 1925.
T. S. MILLER
1,566,111
FLUID PRESSURE OPERATED DEVICE AND CONTROL THEREFOR
Filed Oct. 23, 1923
3 Sheets-Sheet 1
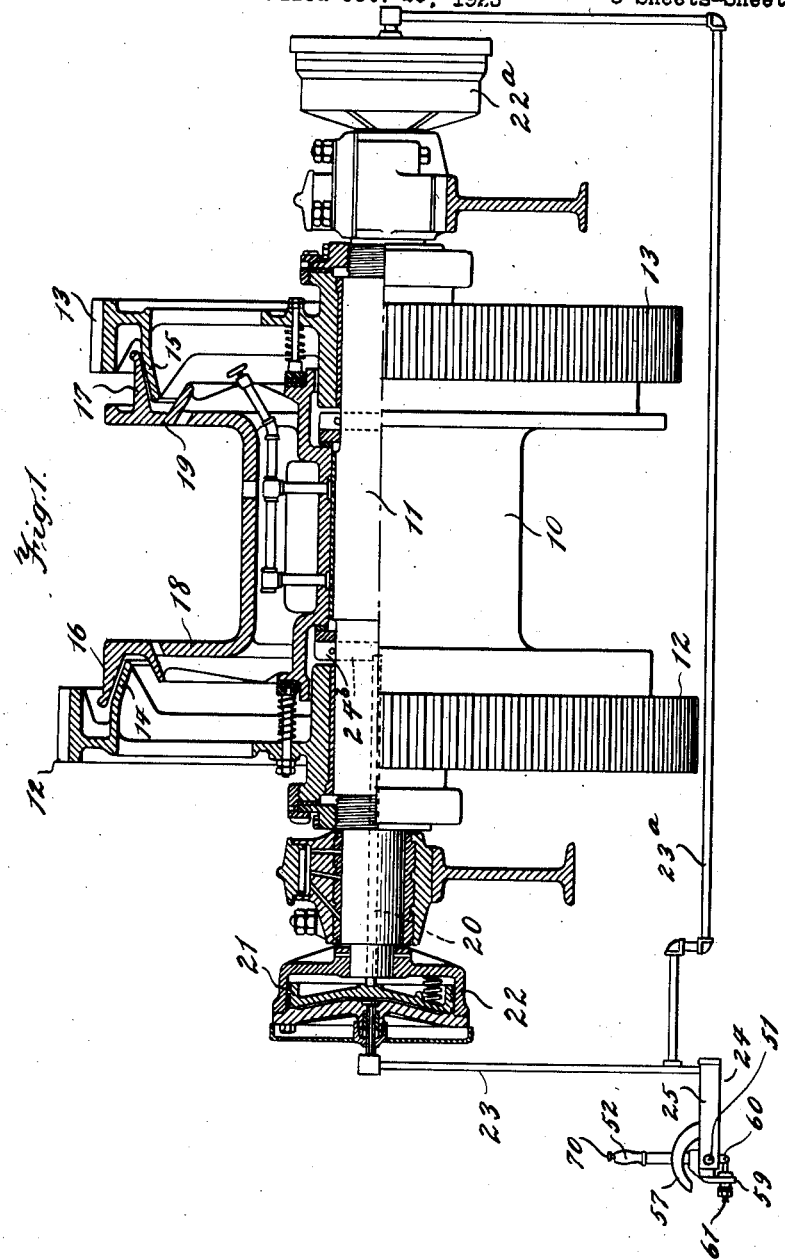
INVENTOR.
Thomas Spencer Miller
BY
Gifford, Bull & Scull
his ATTORNEYS

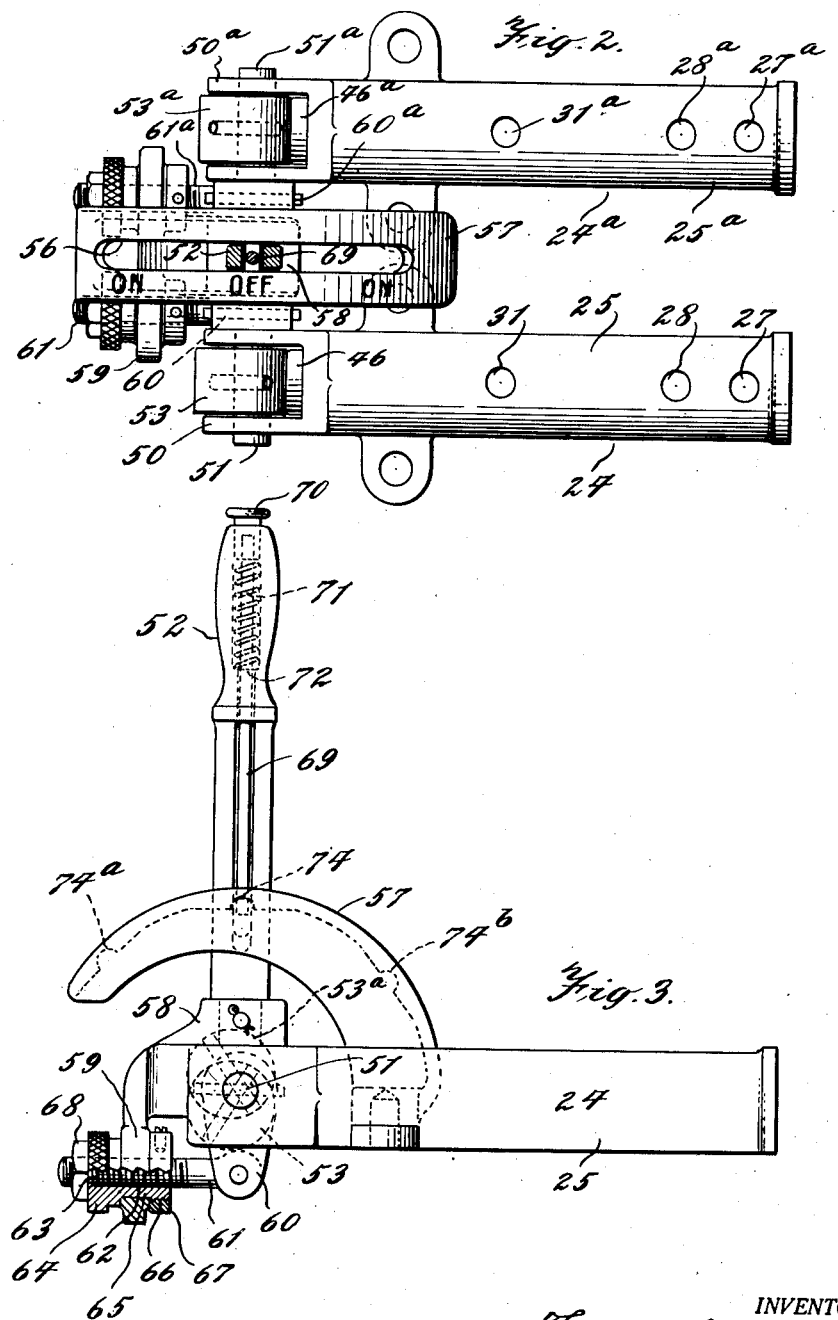

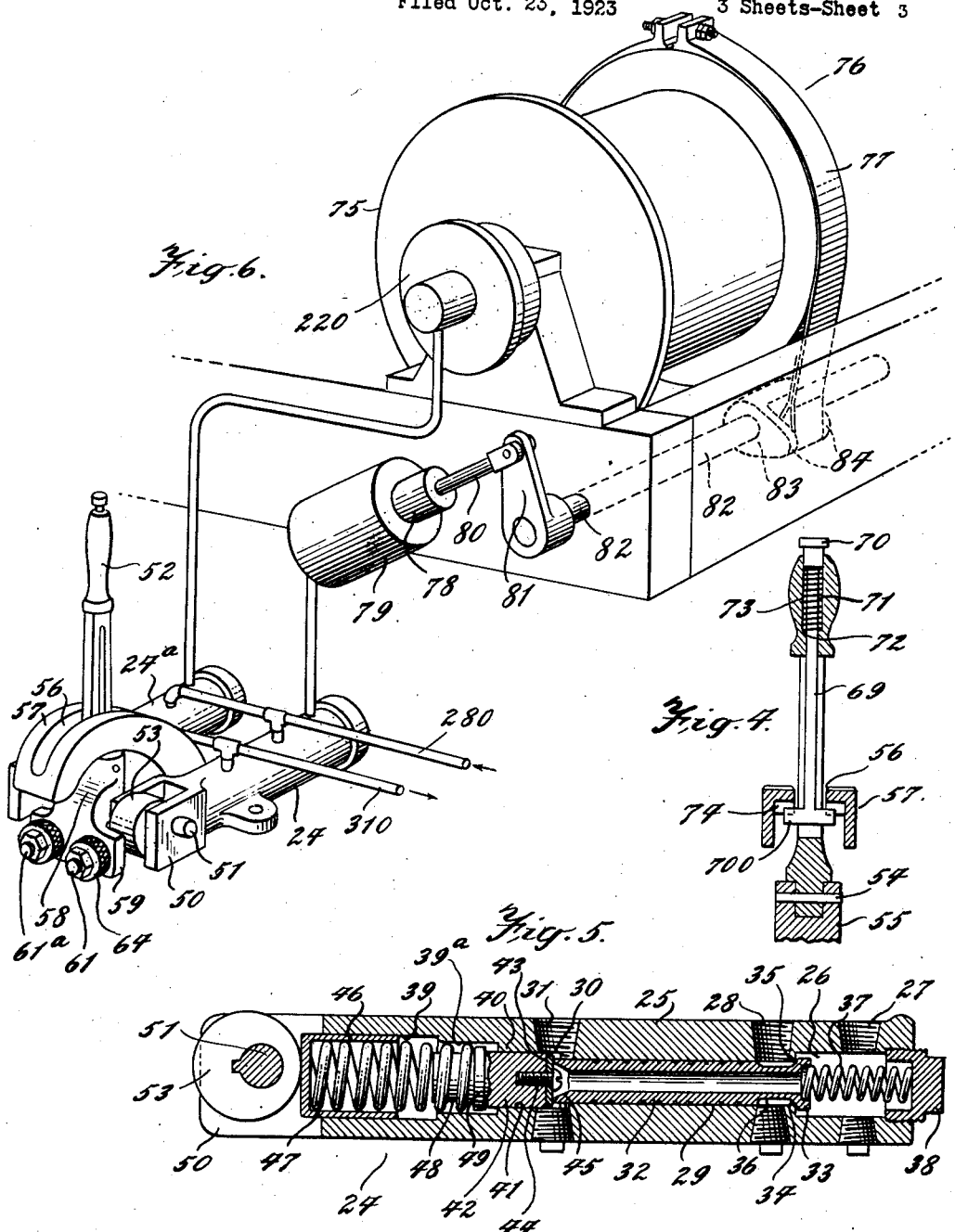

Patented Dec. 15, 1925.

1,566,111

UNITED STATES PATENT OFFICE.

THOMAS SPENCER MILLER, OF SOUTH ORANGE, NEW JERSEY.

FLUID-PRESSURE-OPERATED DEVICE AND CONTROL THEREFOR.

Application filed October 23, 1923. Serial No. 670,235.

*To all whom it may concern:*

Be it known that I, THOMAS SPENCER MILLER, a citizen of the United States, residing at South Orange, in the county of Essex and State of New Jersey, have invented certain new and useful Improvements in Fluid-Pressure-Operated Devices and Control Therefor, of which the following is a specification.

My invention consists of certain novel parts and combinations of parts particularly pointed out in the claims.

The following is a description of an apparatus for carrying out my invention in the form at present preferred by me, but it will be understood that various modifications and changes may be made without departing from the spirit of my invention and without exceeding the scope of my claims.

My invention will best be understood by reference to the accompanying drawings, in which Figure 1 is a sectional elevation illustrating a two-speed drum in connection with which my invention may be used; Fig. 2 is a plan view of the two valves controlling the fluid under pressure to the respective fluid pressure operated devices; Fig. 3 is a side view of Fig. 2; Fig. 4 is a sectional view through the operating handle for the valves; Fig. 5 is a sectional view through one of the valve members, and Fig. 6 is a perspective view illustrating my invention in connection with a fluid pressure operated friction clutch and a fluid pressure operated brake.

Like reference characters indicate like parts throughout the drawings.

Referring now to the drawings and first to Fig. 1, 10 is a drum loosely mounted on the drum shaft 11, and is longitudinally movable therealong. A relatively low speed gear 12 is loosely mounted on the shaft 11 adjacent to one end of the drum 10, and a relatively high speed gear 13 is also loosely mounted on the shaft 11 adjacent to the other end of the drum. It will be understood that the gears 12 and 13 are driven by suitable pinions (not illustrated). The gears 12 and 13 are provided with conical friction flanges 14 and 15, respectively, which cooperate with corresponding conical friction flanges 16 and 17, which are formed on the end flanges 18 and 19 of the drum 10. Normally the drum occupies an intermediate position between the gears so that the friction member 14 is free from the member 16, and the friction member 15 is likewise free from the friction member 17. The drum is moved longitudinally of the shaft by a fluid pressure operated thrust mechanism, which is the same at each end of the shaft, so that a description of one will suffice for the other. Referring to the arrangement illustrated at the left-hand end of Fig. 1, this thrust mechanism comprises a pin 20 which is received in a longitudinal opening in the shaft 11, and which is operated by a piston 21 in a cylinder 22, to which steam is admitted by a pipe 23. The inner end of the pin engages a key $24^b$ which is received in a transverse slot (not shown) in the shaft 11, and wider than the key. The key engages the left-hand end of the drum as shown, so that when the thrust mechanism is moved to the right, the drum is also moved to the right, thereby bringing the friction flange 17 on the drum into engagement with the friction flange 15 of the low power, high-speed driving gear 13. The drum may be moved to the left, as viewed in Fig. 1, when fluid pressure is admitted to the cylinder $22^a$ at the right of Fig. 1, in the same manner as previously described.

I have illustrated in Fig. 5 one of the valve members, indicated generally at 24, which controls the admission of fluid under pressure to the fluid pressure operated device, and also preferably controls the exhaust of fluid pressure therefrom. The valve member comprises a valve casing 25, provided with a chamber 26, with which a port 27 communicates, the supply pipe 23 for the fluid pressure operated device at the left of Fig. 1 being connected to said port 27. The valve casing is also provided with a port 28, also communicating with the chamber 26 of the valve casing, and by means of which fluid under pressure is supplied to the pipe 23 through said valve casing. The valve casing is provided with a longitudinal bore 29, which at one end communicates with said chamber 26, and at the other end opens into an exhaust or relief opening or chamber 30, which opens to the atmosphere through a port 31 and pipe 310. Slidably disposed in the bore 29 is a cylindrical hollow valve 32, the bore of which opens at one end into the chamber 26, while the opposite end thereof opens into the relief chamber 30. The right-hand end of the valve 32, as viewed in Fig. 5, projects into the chamber 26, and is provided with a valve head 33, having a conical face 34 adapted to cooperate with a valve set 35 formed at the juncture of the chamber 26 with the bore 29. The valve 32 is provided at the base of the head 33 with an annular groove 36. The arrangement is such that when the valve is seated against the seat 35, communication is cut off between the supply port 28 and the port 27, with which the supply pipe 23 communicates, thereby preventing flow of fluid under pressure to the port 27 and the pipe 23, while when the valve is unseated, the pressure medium may flow from the port 28 through the groove 36 and thence into the chamber 26 and out through the port 27 and pipe 23 to the cylinder 22. The valve is normally moved to its seat by an expansive coil spring 37 located in the chamber 26, and the ends of which abut respectively the end of the valve and a head 38, which is preferably screwed into and closes the end of the casing 25. At the end of the casing 25, opposite to that containing the chamber 31, is a longitudinally extending bore 39, with a contracted portion at 39ª, concentric with the bore 29 and which is separated therefrom and from the relief port 31 by a wall 40, which is provided with a central circular opening 41, in which is slidably disposed a cylindrical valve block 42, preferably of a length greater than the thickness of said wall 40. One end of the member 42 is preferably provided with a valve seat 43, against which the valve 32 is seated, and which is preferably secured to the member 42 by a screw 44. The end of the bore through the valve 32 adjacent to the seat 43 is preferably flared, as indicated at 45.

Located in the bore 39 of the valve casing is a hollow piston or head 46 open at one end and closed at the other end, as shown. A coil spring 47 is partially enclosed in the piston 46 and seated at one end against the end wall of the piston, while the opposite end thereof surrounds a head or plunger 48, provided at one end with a flanged head or collar 49, against which the opposite end of the spring 47 is seated, and which engages the end of the member 42, the spring 47 normally exerting its expansive force to force the member 42 to the right, as viewed in Fig. 5, into engagement with the adjacent end of the valve 32. The left end of the valve casing, as viewed in Figs. 5 and 6, is provided with spaced ears or lugs 50, having bearings in which rotates an operating shaft 51 for the associated valve, adapted to be moved in either direction by a hand lever 52, a cam 53 being mounted on the shaft 51 and engaging the closed end of the piston 46 to compress the spring 47 to a greater or less extent.

The valve member 24ª is or may be the same as the valve member 24, and need not further be described. I have applied the same reference characters to parts corresponding to those of the valve member 24, but with the letter a appended. A cam 53ª is mounted on a shaft 51ª, having its bearings in the ears 50ª of the valve casing 25ª, as described, in connection with the valve member 24.

Preferably, both of the valves are simultaneously operated by manual means, operable either by the hand or foot, and here illustrated as a hand lever 52, in a manner which will now be described. The handle is mounted on a shaft 54 (Fig. 4) in a frame 55, and passes through and is guided by a slot 56 in a stationary quadrant 57. On the lower portion of the handle is mounted a member 58 flared outwardly, as indicated in Fig. 6, into a flange 59 by means of which both cams 53 and 53ª are simultaneously operated by the movement of the handle 52, and generally in reverse directions. On the shafts 51 and 51ª are secured arms 60 and 60ª, connected to the flange 59 by bolts 61 and 61ª, which pass through openings in the flange, the opening for the bolt 61 being indicated at 62. The bolt 61 is preferably screw-threaded, as at 63, to receive a nut 64, threaded to the bolt 61, and provided with a shank, as at 65, passing through the opening 62 and screw-threaded on its outer surface, as at 66, to receive a nut 67 on the inner side of the flange 59. A lock nut 68 preferably engages the bolt 61 outside of the nut 64 to lock the parts in position. It will be evident that by adjusting the bolt 61 outwardly or inwardly with respect to the flange 59, the angular position of the shaft 51, and of the cam 53 secured thereon, may be varied and any desired adjustment may be obtained. Similarly, the angular position of the shaft 51ª and of the cam 60ª secured thereon may be obtained. The handle is provided with a rod 69, extending longitudinally thereof, and provided at its outer end with a plunger 70, by which the rod may be depressed, a coil spring 71 being interposed between the head 70 and a shoulder 72, formed at the lower end of a bore 73, formed in the handle. The lower end of the rod 69 is provided with a latch member 700 which extends laterally from the handle and rides along the lower faces of the two sides of the quadrant, as best shown in Fig. 4. The quadrant is provided preferably on both sides with notches or openings 74, 74ª and 74ᵇ, as indicated in dotted lines in Fig. 3, within which notches the latch 70 is adapted to be received to lock the handle in a desired position. It will, of course, be understood that any desired number of the notches 74 may be used.

Generally, the cams 53 and 53ª will be mounted on their shafts 51 and 51ª, in such a way that the cam portions will be oppositely directed, as indicated in Fig. 3. With the handle in the middle or neutral position, the cams 53 and 53ª may be so adjusted on their shafts that both of the valves will be in a closed position. When the handle 52 is moved in one direction, as to the right, as viewed in Fig. 3, the cam 53ª will move the piston 46ª to the right, which in turn moves the valve 32ª to the right, against the action of the spring 37ª, to open the same and admit fluid pressure from the supply pipe 280, port 28ª, through the groove 36ª, chamber 26ª and port 27ª, to the pipe 23ª, leading to the cylinder 22ª at the right, as viewed in Fig. 1. At the same time the other cam 53 will be further moved away from its piston 46, thereby retaining the valve 32 in the closed position. The valve 32 being hollow, the valve seat 43ª is subjected to the pressure of the fluid in the chamber 26ª and the pipe 23ª. The pressure medium continues to flow through the chamber and through the pipe 23ª until the pressure becomes sufficient to move the member 42ª to the left, due to the pressure thereon and to the pressure on the head of the valve 32ª, causing the valve to close at a predetermined pressure. It will be evident, however, that by varying the angular position of the cam 53, and thereby adjusting the compression of the spring 47, the valve can be made to close at any desired pressure, and thereby any desired pressure maintained in the fluid pressure operated device.

When the handle 52, on the other hand, is moved to the left, as viewed in Fig. 6, the cam 53 is rotated anti-clockwise to move the associated piston 46 to the right and similarly open communication between the supply pipe 280 and the pipe 23, to admit fluid under pressure to the piston 22, the other valve of the valve member 24ª remaining closed during this operation.

By the independent adjustments for operating the two valves from the single manually operated lever, it will be evident that the valves may be made to maintain any desired pressures in the fluid pressure operated devices. For example, the pressure in the feed line may be as high as 250 pounds. One ram or piston in the fluid pressure operated device may require 200 pounds pressure to cause the friction to set and hold, while the other fluid pressure operated device may require only 150 pounds. It is always desirable in a machine of the character illustrated, to carry sufficient pressure only to do the work, for any material excess of pressure causes jars which may, at times, be injurious to the machinery. While I have illustrated and described the cams as being adjusted for a certain condition of operation, it will, of course be understood that they may be independently adjusted to cause the fluid pressure operated devices to maintain any desired pressure, and that they may be adjusted relatively to each other in any desired manner.

In Fig. 6, I have illustrated my invention in connection with a fluid pressure operated friction device, illustrated generally at 75, and a fluid pressure operated friction brake as at 76. The friction band 77 of the brake is operated by means of a piston 78 in a cylinder 79, the stem 80 of the piston being connected to an arm 81 on a shaft 82, having its bearings in the frame of the device. On the shaft 82 is secured a collar 83, preferably provided with two ears 84, between which is a bolt (not shown) to which one end of the friction band is secured, as shown. The operation of the device, shown in Fig. 6, will be similar to that already described in connection with Fig. 1, and needs no further comment. With the device shown in Fig. 6, it may require, for example, 100 pounds pressure for the operation of the friction device and 150 pounds for the operation of the brake. If now it is desirable at any time to hold the brake at a point of slippage, it is simpler to adjust the cam to that point and throw the lever hard over to one extreme or the other, and have a notch there to hold it. It will be evident that with the arrangement illustrated, the cam controlling the operation of the brake can be so adjusted that slippage will be secured when the lever is thrown to the extreme left, as viewed in Fig. 6.

Not only does the valve member illustrated control the admission of fluid under pressure to the fluid pressure operated device, but it can be made to control the exhaust of fluid pressure therefrom. This may be done by operating the lever in such a direction that the tension on the spring 47 is weakened. This will cause the pressure medium which acts through the hollow valve 32 upon the member 42 to depress the member, thereby permitting the pressure medium to exhaust through the port 31 and the pipe 310. By so controlling the exhaust of fluid pressure, slippage either of the friction device or of the brake device can be secured. The control of the exhaust is desirable, for example, in a high lead yarding system where the logs are hauled from a distance to a point near the spar or tree. As the log approaches, it is elevated. By slipping the friction, the log is easily dropped without jar to the rigging. In the absence of the control of the exhaust, the log would be permitted to drop suddenly, thereby causing whipping of the spar and a general wrenching and strain on the rigging.

I claim:

1. In combination, two fluid pressure operated devices, a source of fluid under pressure, two valve members controlling the flow of fluid under pressure to the respective devices, and each constructed and arranged to maintain a predetermined pressure in the associated fluid pressure operating device, and a single means for simultaneously operating both of said valves.

2. In combination, two fluid pressure operated devices, a source of fluid under pressure two valve members controlling the flow of fluid under pressure to the respective devices, and each constructed and arranged to maintain a predetermined pressure in the associated fluid pressure operated device, and a single manual means for simultaneously operating both of said valves.

3. In combination, two fluid pressure operated devices, a source of fluid under pressure, two valve members controlling the flow of fluid under pressure to the respective devices, and each constructed and arranged to maintain a predetermined pressure in the associated fluid pressure operated device, and a single manual means for simultaneously operating both of said valves in reverse directions.

4. In combination, two fluid pressure operated devices, a source of fluid under pressure, two valve members controlling the flow of fluid under pressure to the respective devices, manually operated means for simultaneously operating said valves in reverse directions, and means for adjusting the operation of each of said valves from the said manually operated means whereby each may be made to maintain different pressures in its associated fluid pressure operated device.

5. In combination, two fluid pressure operated devices, a source of fluid under pressure, two valve members controlling the flow of fluid under pressure, to the respective devices, manually operated means for simultaneously operating said valves in reverse directions, the connections between said manually operated means and said valves including adjustable means whereby each may be made to maintain different pressures in the associated fluid pressure operated device.

6. In combination, two fluid pressure operated devices, a source of fluid under pressure, two valve members controlling the flow of fluid under pressure to the respective devices, manually operated means for simultaneously operating said valves in reverse directions, the connections between said manually operated means and said valves including adjustable yielding means whereby each may be made to maintain different pressures in the associated fluid pressure operated device.

7. In combination, two fluid pressure operated devices, a source of fluid under pressure, two valve members controlling the flow of fluid under pressure to the respective devices, manually operated means for simultaneously operating said valves in reverse directions, yielding means for each valve tending to seat the same, yielding adjustable means for operating each valve from said manual means, each valve and associated parts being constructed and arranged to cause the fluid under pressure in each fluid pressure operated device to resist the operation of said yielding adjustable means.

8. In combination, two fluid pressure operated devices, a source of fluid under pressure, two valve members controlling the flow of fluid under pressure to the respective devices, each valve member comprising a hollow valve controlling the flow of pressure medium to its associated fluid pressure operated device and adapted to be moved to closed position by said pressure medium, and the bore of said valve being open to the pressure medium, a relief valve normally closed and exposed to said medium and movable toward and away from the hollow valve, a spring tending to maintain said relief valve closed and a single means for operating both of said valves.

9. In combination, two fluid pressure operated devices, a source of fluid under pressure, two valve members controlling the flow of fluid under pressure to the respective devices, each valve member comprising a hollow valve controlling the flow of pressure medium to its associated fluid pressure operated device and adapted to be moved to closed position by said pressure medium, and the bore of said valve being open to the pressure medium, a relief valve normally closed and exposed to said medium and movable toward and away from the hollow valve, a spring tending to maintain said relief valve closed and a single manually operated member for operating both of said valves.

10. In combination, a source of fluid under pressure, a winding drum, frictional driving means for said drum, a brake for said drum, fluid pressure operated devices for causing said drum operatively to engage the said frictional driving means and the brake to engage the said drum respectively, two valve members for controlling the flow of fluid under pressure to the respective fluid pressure operated devices, and a single lever for simultaneously operating both of said valves.

THOMAS SPENCER MILLER.